United States Patent Office 3,472,916
Patented Oct. 14, 1969

3,472,916
COPOLYMERS OF ETHYLENE AND ALKYL ACRYLATES AS PLASTICIZERS IN POLYCARBONAMIDE RESINS
Harry D. Anspon, Kansas City, Mo., and Howard E. Robb, Henderson, Ky., assignors to Gulf Oil Corporation, Pittsburgh, Pa., a corporation of Pennsylvania
No Drawing. Filed Dec. 1, 1965, Ser. No. 510,968
The portion of the term of the patent subsequent to Mar. 26, 1985, has been disclaimed
Int. Cl. C08g 41/04, 51/38
U.S. Cl. 260—857         9 Claims

ABSTRACT OF THE DISCLOSURE

Copolymers of ethylene and alkyl acrylates as plasticizers in polycarbonamide resins are disclosed to improve moisture pick-up, impact strength, molding characteristics, and structure uniformity.

---

This invention relates to polycarbonamide compositions, and more particularly to novel compositions of polycarbonamide resins, of the nylon type, and copolymers of ethylene and alkyl acrylates.

The incorporation of plasticizers in polycarbonamide resins, of the nylon type, is known. However, heretofore, the addition of such plasticizers to polycarbonamide resins has been generally for the purpose of improving the pliability of such resins. Although the addition of such plasticizers has been accompanied by modification of physical properties, including improvements thereon, nevertheless such addition of plasticizers has had substantially no effect or, if any, very little effect on the impact resistance and moisture pick-up of the polycarbonamide resins. As a result such prior art plasticized polycarbonamide resins have remained deficient in impact strength (i.e., shock resistance) and moisture pick-up which has restricted the usefulness of the resins for various molding and forming operations, and in use of manufactured articles which require higher impact strengths in the resin. In addition, many of the prior art plasticizers have had a tendency to detract from the color of the polycarbonamide resins which would normally be imparted by coloring agents, with particular difficulty in obtaining pastel colors in the resins.

Accordingly, it is an object of this invention to provide improved modified compositions of polycarbonamide resins, of the nylon type.

Another object of this invention is to improve the properties of plasticized polycarbonamide resins and the articles derived therefrom.

A further object of this invention is to provide novel compositions of polycarbonamide resins containing as a plasticizer therefor ethylene/alkyl acrylate ester copolymers.

A still further object of this invention is to provide novel compositions comprised of a polycarbonamide resin and a copolymer of ethylene and an alkyl acrylate ester.

Other objects and advantages of this invention will become more apparent from the description of the invention given below.

It was discovered in accordance with this invention that the addition of a copolymer of ethylene and an alkyl acrylate ester as a plasticizer to polycarbonamide resins produces compositions having a reduced tendency to moisture pick-up and greater resistance to shock, i.e., greater Izod impact strengths. Furthermore such blends have better molding characteristics and possess a fine uniform structure. Table I contains molding conditions of a typical blend.

TABLE I.—MOLDING CHARACTERISTICS OF POLYCARBONAMIDE AND POLYCARBONAMIDE BLENDS (95 WT. PERCENT POLYCARBONAMIDE AND 5 WT. PERCENT ETHYLENE/METHYL ACRYLATE COPOLYMER) [1]

| Characteristic | Polycarbonamide | Blend |
|---|---|---|
| Plunger forward (sec.) | 20 | 20 |
| Booster (sec.) | 1 | 1 |
| Die close (sec.) | 30 | 30 |
| Die open (sec.) | 4 | 4 |
| Hydraulic oil injection molding pressure (p.s.i.) | 1,275 | 1,425 |
| Mold temperature (° F.) | 130 | 130 |
| Cylinder temperature (° F.): | | |
| Rear | 520 | 520 |
| Front | 520 | 520 |
| Surface | Good | Good |
| Flow | Good | Good |
| Mold release | Fair | Excellent |

[1] This copolymer contained 20 weight percent methyl acrylate.

These copolymers are normally solid copolymers of ethylene and contain from about 10 to about 60 percent by weight of a chemically combined ester of acrylic acid or methacrylic acid in which the alkyl moiety or group contains from 1 to 4 carbon atoms. Preferably, these copolymers will have chemically combined therein from about 5 to about 20 percent by weight of the alkyl esters of acrylic acid or methacrylic acid. Specifically, these esters include methyl, ethyl, propyl, iso-propyl, butyl, iso-butyl and t-butyl esters of acrylic acid and methacrylic acid.

The method of preparing these copolymers of ethylene and alkyl acrylate is not critical, and they may be prepared by any of the various processes known in the art, typical of which are those found in patents such as U.S. 2,200,492 and U.S. 2,953,551. A particularly effective class of such polymers is disclosed in British Patent No. 900,969. The copolymers obtained in accordance with this British patent have a highly uniform distribution of the acrylate ester in the copolymer, and accordingly the teachings of this British patent are incorporated herein by reference thereto. These copolymers can be prepared with a wide range of chemically combined alkyl acrylate content extending to as low as 2 percent by weight. However, it is critical for purposes of this invention that the copolymer contain chemically combined therein about 10 to 60 percent, by weight, of the alkyl acrylate. A typical copolymer within the scope of this invention is a copolymer of ethylene and about 20 weight percent of chemically combined methyl acrylate and having a melt index of about 1.5 to 15. In general, the copolymers contemplated within this invention will have a melt index of about 1.5 to about 20.

The polycarbonamides contemplated within and modified by this invention are the conventional and commercial nylon and polyamide resins having recurring amide groups as integral parts of a molecular chain structure characterized by amide links and hydrocarbon links along the chain. Typical of these polycarbonamides is the product commercially known as nylon 6 which is obtained by the polymerization of caprolactam. Another typical polycarbonamide is that obtained by the condensation of a dibasic organic acid (e.g., adipic or sebacic) and a diamine (e.g., hexamethylene), as for example nylon 6—6. A further illustrative polycarbonamide is the copolymer of an amino acid or the lactam thereof (e.g., caprolactam), a dibasic acid (e.g., isophthalic acid) and a diamine (e.g., m-xylene diamine). In general, these polycarbonamides will have a molecular weight in excess of 20,000.

The polycarbonamides and the ethylene/alkyl acrylate copolymers can be blended together by any conventional method to form the compositions of this invention. For example, granules of the polycarbonamide and the copolymer may be first mechanically mixed together by conventional methods followed by forcing a melt of the mixed polycarbonamide/copolymer granules through a compounding extruder type of mixer, with the solidified extrudate suitably comminuted or subdivided into pellet or granule form of any desired form. As will be appreciated, the mixture of polycarbonamide/copolymer granules can be blended or compounded together by means of other conventional techniques such as by milling on hot rolls, working in a plasticator or by means of a heated kneading machine such as a Banbury mixer. Also, the copolymer can be added to the polycarbonamide polymerizate as it is withdrawn from the polymerization column by means of a pin-mixer positioned at the bottom of the column, whereat the copolymer is added through a side entry part of the pin-mixer directly into the withdrawn polymerizate.

In general, the proportion of the copolymer to be used in conjunction with the polycarbonamide will depend on the physical properties desired in the final composition, and particularly on the improvement desired, for a particular application, in impact strength and/or resistance to moisture pick-up. Normally, the objectives of this invention are obtained in which the proportions of the copolymer to polycarbonamide in the final composition are in the range of about 2 to about 30 weight percent and preferably about 5 to about 20 weight percent of the copolymer, and about 70 to 98 weight percent and preferably 80 to 95 weight percent of the polycarbonamide.

In general, the copolymer/polycarbonamide compositions may be employed in any conventional shaping and forming devices and equipment normally employed with prior art polycarbonamides. Typical of such devices and equipment are extruders, injection molding devices and compression molding devices which shape the compositions into various useful articles. Thus, the compositions can be shaped into films, sheets, tubes, rods, sheathing, household articles and into various hardware fixtures for automobiles, machinery, windows, plumbing and the like which are normally formed from prior art polycarbonamides.

In addition to the two foregoing primary constituents, of copolymer and polycarbonamide, the compositions of this invention may also include minor amounts of conventional additives normally employed in polycarbonamides. Such additives are well known in the art, as for example, fillers, mold release agents, lubricants, light stabilizers, pigments, dyes and the like.

The following examples are set forth for purposes of illustrating the invention, with the proportions of components set forth in parts and percentages by weight, unless otherwise specified.

Example I

A series of test bars ⅛″ x ½″ x 2½″ were prepared by injection molding a granulated commercial grade polycarbonamide for determining its Izod impact strength in accordance with the procedure of ASTM D256-56. This polycarbonamide was a condensation product of caprolactam and is commonly known as "nylon-6." It had a melt index of 7.0 at 235° C. with a 2160 gm. weight sample.

The Izod impact strength of this resin, as determined by this ASTM test, was 0.55 foot pound per inch of notch.

Example II

Four hundred seventy five parts of the finely divided polycarbonamide and twenty-five parts of ground ethylene/methyl acrylate copolymer were tumble mixed and blended by extruding in a one inch "NRM" extruder through ⅛″ orifice die. The temperature at the rear barrel of the extruder was 560° F. and at the front end barrel was 470° F. The extruded strand was cube cut and cooled. The extrusion and cube cutting was repeated once again and finally the strand was cooled and dried. The dried material was finely ground and pressed into sheets for testing.

The impact tensile strength of this resin as measured according to ASTM D1822–61T test was 63 ft. lbs./in.$^2$, and flexural stiffness as determined according to ASTM test D790–58T was 197,000 lbs./in.$^2$. Similar measurements made on a sample of carbonamide alone gave values of 108 ft. lbs./in.$^2$ and 146,000 lbs./in.$^2$ for tensile impact strength and flexural stiffness respectively.

The copolymer employed in this example had a melt index of 1.81 and contained 23.6 percent by weight of chemically combined methyl acrylate.

Example III

The preparation of a blend as reported under Example II was repeated using the same raw materials except that four hundred fifty parts of polycarbonamide and fifty parts of ethylene/methyl acrylate copolymer was employed in the mix.

The values for impact tensile strength and flexural stiffness for this resin were 59 ft. lbs./in.$^2$ and 150,000 lbs./in.$^2$ respectively.

Example IV

Ninety five parts of the commercial polycarbonamide of Example I and five parts of ethylene/methyl acrylate polymer having a melt index of 2.0 and containing 15.0 percent by weight of chemically combined methyl acrylate were tumble mixed and blended as mentioned in Example II.

The impact tensile strength of the sample as measured by the ASTM D1822–61T test was 132 ft. lbs./in.$^2$ and the flexural stiffness as measured according to ASTM D790–58T was 208,000 lbs./in.$^2$.

Example V

Preparation mentioned in Example IV was repeated except that ninety parts of polycarbonamide and 10 parts of ethylene/methyl acrylate polymer were used in making the blend.

The values of impact tensile strength and flexural stiffness as measured according to standard ASTM procedures were 59 ft. lbs./in.$^2$ and 237,000 lbs./in.$^2$ respectively.

Example VI

Eighty parts of commercial polycarbonamide described in Example I and twenty parts of ethylene/methyl acrylate copolymer of Example IV were blended as mentioned earlier. The blended resin had an impact tensile strength of 45 ft. lbs./in.$^2$ and flexural stiffness of 148,000 lbs./in.$^2$.

Example VII

Ninety-five parts of the commercial grade polycarbonamide of Example I was tumble mixed with five parts of an ethylene/methyl acrylate copolymer having a melt index of 2 and containing 15 weight percent of chemically combined methyl acrylate.

The mix was compounded in a conventional plastic extruder in the form of a strand which was in turn comminuted into molding granules.

This granulated and blended polycarbonamide composition was then injection molded into ⅛″ x ½″ x 2½″ test-bars, and tested in accordance with the procedure of ASTM D256-56 for Izod impact strength. The Izod impact strength of this resin blend, as determined by this ASTM test, was 0.78 foot pound per inch of notch.

Example VIII

Example VII was repeated with the exception that the polycarbonamide/copolymer blend was prepared from 185 parts of the polycarbonamide per 15 parts of the ethylene/methyl acrylate copolymer.

The Izod impact strength of this composition, as determined by the ASTM D246-56 test, was 0.78 foot pound per inch of notch.

Example IX

Example VII was repeated with the exception that the polycarbonamide/copolymer blend was prepared from 90 parts of the polycarbonamide per 10 parts of the ethylene/methyl acrylate copolymer.

The Izod impact strength of this composition, as determined by the ASTM D246-56 procedure, was 0.74 foot pound per inch of notch.

Example X

A series of impact trays were prepared from the commercial grade polycarbonamide of Example I for purposes of testing in accordance with the test described below. These trays were then moisture conditioned prior to testing by submersion in room temperature water for 56 hours, taken out of the water and then allowed to stand in the open for 72 hours. The trays were cooled to the indicated testing temperature in an Aminco cold box.

The impact resistance of these trays was measured by determining the impact energy at which 50 percent strength failure of the trays occurs at a given temperature when a stainless steel bullet is dropped at a point adjacent to a corner of the trays. Impact energy was measured in foot pounds by multiplying the weight of the bullet by the drop height level from which the dropped bullet will cause 50 percent failures in the trays.

A brittle failure is evidenced by breakage of the tray in at least two pieces, shattering in much the same manner as glass does. A glass-like fracture, without breaking into discrete parts, was also considered as a brittle failure.

The bullet was 29/32 inch O.D. with its cylindrical portion 6¼ inches long. The bullet had a 9/16 inch diameter spherical nose, tapered back to a 60° included angle. The bullet was directed to the trays through a 2½2 inch I.D. aluminum guide.

The test specimens were injection molded trays of about 6½"x2¾"x1" deep, prepared in 4½ ounce Reed-Prentice injection molder.

The following conditions were employed for injection molding of the test trays prepared in Examples X to XIII.

Nozzle temperature _____° F__ 470
Mold temperature _____° F__ 200
Cycle:
   Injection _____seconds__ 20
   Die cooling _____do____ 30
   Ejection (die open) _____do____ 10
Pressure _____ To control flash The hydraulic oil injection molding pressure employed was 850 p.s.i.g.

The specific hydraulic oil injection molding pressure employed in each of Examples XI to XIII will be described therein.

The cold smash impact resistance of these trays at −30° C., as determined by the foregoing test, was 21.0 foot pounds.

Moisture pick-up measurements were also made by weighing the trays before and after moisture conditioning. The moisture pick-up of these trays was 2.7 percent.

Example XI

The preparation of the polycarbonamide/copolymer granulated blend of Example VII was repeated, and the molding granules injected into impact test trays for testing in accordance with the foregoing procedure. The molding pressure employed was 900 p.s.i.g.

These trays were then moisture conditioned prior to testing by submersion in room temperature water for 56 hours, taken out of the water, and allowed to stand in the open for 72 hours.

The cold smash impact resistance of these trays at −30° C. was 21.0 foot pounds.

Moisture pick-up of these trays, as determined by weighing the trays before and after moisture conditioning was 1.9 percent.

Example XII

The preparation of the polycarbonamide/copolymer granulated blend of Example VIII was repeated, and the molding granules injection molded into impact test trays for testing in accordance with the aforementioned procedure. The molding pressure employed was 800 p.s.i.g.

These trays were then moisture conditioned prior to testing by submersion in room temperature water for 56 hours, taken out of the water, and allowed to stand in the open for 72 hours.

The cold smash impact resistance of these trays at −30° C. was 18.4 foot pounds.

Moisture pick-up of these trays, as determined by weighing the trays before and after moisture conditioning was 1.8 percent.

Example XIII

The preparation of the polycarbonamide/copolymer granulated blend of Example IX was repeated, and the molding granules injection molded into impact test trays for testing in accordance with the foregoing procedure. The molding pressure employed was 700 p.s.i.g.

These trays were then moisture conditioned prior to testing by submersion in room temperature water for 56 hours, taken out of the water, and allowed to stand in the open for 72 hours.

The cold smash impact resistance of these trays at −30° C. was 34.2 foot pounds.

Moisture pick-up of these trays, as determined by weighing the trays before and after moisture conditioning was 1.7 percent.

Other physical properties of the polycarbonamide/copolymer compositions of this invention were measured on injection molded test specimens as specified for standard ASTM tests. These polycarbonamide/copolymer compositions, of this invention, gave values of tensile strength, elongation, tensile modulus, flexural strength, and compression strength that were equal or comparable to unplasticized polycarbonamides, i.e. copolymer free. The color and clarity of the compositions of this invention was superior to simple compositions of unplasticized resins.

Although the invention has been described with reference to specific materials, embodiments and details, various modifications and changes, within the scope of the invention, will be apparent to one skilled in the art and are contemplated to be embraced within the invention.

What is claimed is:

1. A blended composition consisting essentially of a polycarbonamide having recurring carbonamide groups as an integral part of the polymer chain and from about 1 to about 20 percent by weight of a copolymer consisting essentially of ethylene and an alkyl acrylate ester selected from the group consisting of esters of acrylic acid and methacrylic acid with the alkyl group of said acrylate ester containing from 1 to 4 carbon atoms and with said copolymer containing chemically combined therein from about 10 to about 60 percent by weight of said alkyl acrylate ester.

2. The composition of claim 1 wherein said alkyl acrylate ester is methyl acrylate.

3. The composition of claim 1 wherein said polycarbonamide is a condensation product of caprolactam.

4. The composition of claim 3 wherein said alkyl acrylate ester is methyl acrylate.

5. A blended composition consisting essentially of a polycarbonamide having recurring carbonamide groups as an integral part of the polymer chain and from 1 to about 10 percent by weight of a copolymer consisting essentially of ethylene and an alkyl acrylate ester selected from the class consisting of esters of acrylic acid and methacrylic acid with the alkyl group of said acrylate ester containing from 1 to 4 carbon atoms and with said copolymer containing chemically combined therein from about 15 to about 40 percent by weight of said alkyl acrylate ester.

6. The composition of claim 5 wherein said alkyl acrylate ester is methyl acrylate.

7. The composition of claim 5 wherein said polycarbonamide is a condensation product of caprolactam.

8. The composition of claim 7 wherein said alkyl acrylate ester is methyl acrylate.

9. A blended composition consisting essentially of a condensation product of caprolactam and about 5% by weight of a copolymer consisting essentially of ethylene and methyl acrylate with said copolymer containing chemically combined therein about 20% by weight of said methyl acrylate.

References Cited

FOREIGN PATENTS 1,302,813  7/1962  France.
1,386,563  12/1964  France.

MURRAY TILLMAN, Primary Examiner
PAUL LIEBERMAN, Assistant Examiner

U.S. Cl. X.R.

260—78, 86.7